United States Patent [19]

Ko

[11] 4,410,440

[45] Oct. 18, 1983

[54] POLYURETHANE MAGNETIC DISK COATINGS

[75] Inventor: Ming Ko, San Jose, Calif.

[73] Assignee: International Business Machines Corporation, Armonk, N.Y.

[21] Appl. No.: 352,737

[22] Filed: Feb. 26, 1982

[51] Int. Cl.³ .................... H01F 10/02; H01F 1/02
[52] U.S. Cl. ................... 252/62.54; 428/425.9
[58] Field of Search ........................ 252/62.54

[56] References Cited

U.S. PATENT DOCUMENTS

| | | | |
|---|---|---|---|
| 3,926,826 | 12/1975 | Graham et al. | 252/62.54 |
| 3,929,659 | 12/1975 | Graham | 252/62.54 |
| 4,020,236 | 4/1977 | Aonuma et al. | 428/457 |
| 4,058,646 | 11/1977 | Vaeth et al. | 428/425.1 |
| 4,074,012 | 2/1978 | Heikkinen et al. | 428/425.9 |
| 4,092,256 | 5/1978 | Goodson et al. | 204/62.54 |
| 4,152,485 | 5/1979 | Mizumura et al. | 428/425.9 |
| 4,286,022 | 8/1981 | Vermillion et al. | 428/423.1 |
| 4,336,308 | 6/1982 | Yamada et al. | 428/425.9 |

OTHER PUBLICATIONS

Mijs et al, Chemical Abstracts, vol. 90, Abstract 13109u, (4/30/79).

*Primary Examiner*—F. Edmundson
*Attorney, Agent, or Firm*—Walter J. Madden, Jr.

[57] ABSTRACT

A polyurethane coating material for magnetic recording disks which is composed of magnetic particles, solvent blends and a thermosetting binder system. The resins are made from blocked isocyanates or blocked polyisocyanates with polyacrylates which contain reactive hydrogens.

5 Claims, 3 Drawing Figures

POLYURETHANE MAGNETIC DISK COATINGS

TECHNICAL FIELD

This invention relates generally to magnetic recording coatings, and more particularly to a magnetic layer on which data is stored in the form of spatially discrete areas, the magnetization of which can be controlled and sensed individually.

BACKGROUND ART

The present invention is directed to magnetic record members used for the storage of information. This information is translated into a code, the elements of which are the direction of the magnetization of discrete areas of a magnetic medium. The information is retrieved by readout devices such as magnetic heads, which sense the direction of the magnetization retained in any of these discrete areas. The magnetic record members involved may be those such as tape, disk, drum or other forms which support the magnetic recording medium.

In order to store large quantities of information, the areas storing each element of information must be small. The distinction of the magnetization of one small area of the magnetic medium from that of contiguous areas generally requires that the magnetic sensing device be placed close to the desired element. This necessitates a precisely defined surface geometry. A high retrieval rate demands a high relative velocity between the medium and the read/write head, and this in turn requires precise surface geometry. The greater the quantity of magnetic information that can be readily stored for distinctive output, and the greater the area useful for the storage of the magnetic information, the better the economy and usefulness of the magnetic recording medium. To store the maximum quantity of magnetic information, the magnetic properties of the recording medium must have critical magnetic and geometric characteristics. These properties must be retained while subject to friction in atmospheres which may contain constituents which corrode metals.

The new magnetic coatings described herein do not require alumina particles to provide coating durability, as do some magnetic coatings. A goal of the present invention is to achieve a particulate magnetic coating which (1) is readily applied to a substrate, (2) has a high pigment volume concentration (PVC) (which is a measure of the amount of magnetic pigment or particles in the coating), (3) provides a high orientation ratio (OR) (this is a measure of the number of magnetic particles in the coating which are magnetically aligned in the desired direction), and (4) has good mechanical properties including durability.

The present coatings include polyurethane and polyacrylates as important elements. The use of polyurethane binders is well known in the art, as exemplified by U.S. Pat. Nos. 3,926,826, 3,929,659, 4,058,646, 4,074,012 and 4,152,485. A copending application assigned to the same assignee as the present application Ser. No. 304,445, filed Sept. 21, 1981 (R09-80-008), disclosed a magnetic recording composition including blocked isocyanates and allyl alcohol. However, none of these prior art coatings are believed to be as attractive as those of the present invention.

The prior art one-component polyurethane coatings have limited storage stability and little cross-linking sites, thus failing to provide good mechanical durability for extremely thin coatings in the range of 5 microinches. Though prior art two-component polyurethane coatings may have a high degree of cross-linking to give good mechanical properties, they are difficult to apply. Other one-component polyurethane magnetic coatings contain polyester diols or polyether diols which have the shortcoming of being easily hydrolyzed under a humid environment. This low hydrolytic stability causes chemical bond breakage which induces poor film-formation. The magnetic coatings are therefore broken up which causes corrosion, contamination and defects on the recording disks. The commonly used epoxy, epoxy-phenolic binder system has the disadvantages of intrinsic gel particles and the requirement for a high curing schedule. The first problem gives rise to defects and, consequently, poor magnetic performance, while the second problem means the use of more energy for coating cure.

SUMMARY OF THE INVENTION

This invention provides a magnetic coating system which contains a one-component polyurethane system which comprises blocked isocyanates and/or blocked polyisocyanates in polyacrylates with reactive hydroxyl, amine or amide groups as the major binders. The system can be formulated at high pigment volume concentrations to produce a coating which can be cured at lower temperatures and which provides improved magnetic and mechanical properties.

DESCRIPTION OF THE PREFERRED EMBODIMENT

Figure 1:
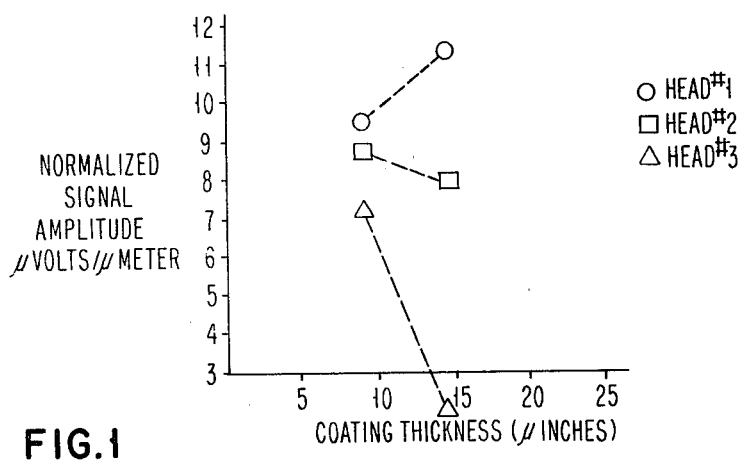

In accordance with this invention, any isocyanates or polysocyanate, reacted with phenols, caprolactams, or oximes are suitable for use. The blocked polyisocyanates are not reactive until heated to a temperature of 150° to 600° F., with or without catalyst. The polyacrylates can be any acrylic resins with functional groups of hydroxy, amines or amides with the following generalized structures:

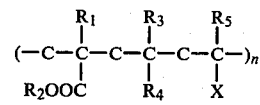

where $R_1$, $R_2$, $R_3$, $R_4$, $R_5$=H, alkyl, aryl groups X=Carbon chain with hydroxyl or amine or amide groups.

The invention involves grinding magnetic pigment in with the desired ratio of blocked isocyanates and polyacrylates. A solvent or solvent blends may be incorporated into the mixture. It is also desirable to incorporate a small amount of catalyst, such as tin compounds and/or amines. The use of some dispersing agent is advantageous to obtain a fine and stable coating dispersion.

The formulation of the recording coatings of the present invention preferably employs the following ratios by weight:

| | |
|---|---|
| 20–70 parts | suitable solvent(s) |
| 20–65 parts | magnetic particles |
| 5–30 parts | acrylic resins |
| 5–30 parts | blocked isocyanates or polyisocyanates |
| 3.0 parts | surfactant(s) (as dispersant and/or wetting agent) |
| 0.005–3.0 parts | additives and catalyst (may be added, depending upon appli- |

The following examples in Table 1 are set forth to better illustrate the preparation of magnetic recording media in accordance with the present invention. All quantities which are presented are parts by weight.

TABLE I

| Components, Parts by Weight | EXAMPLES | | | | | | | |
|---|---|---|---|---|---|---|---|---|
| | 1 | 2 | 3 | 4 | 5 | 6 | 7 | 8 |
| Magnetic particles $\gamma$-$Fe_2O_3$ | 27.6 | 27.6 | 27.6 | 27.6 | 27.6 | 27.6 | 27.6 | 27.6 |
| Mondur HCB | 10.2 | 7.0 | 14.5 | 12.6 | 3.2 | 3.2 | 15.3 | 10.9 |
| Acrylic resins: | | | | | | | | |
| G-Cure 867RX60 | 9.8 | | | | | | | |
| G-Cure 868RX-60 | | 13.1 | | | | | | |
| Acryloid OL-42 | | | 5.5 | | | | | |
| Acryloid AT 400 | | | | 7.4 | | | | |
| Acryloid AT 56 | | | | | 16.8 | | | |
| Acryloid AT 63 | | | | | | 16.8 | | |
| Acryloid AU 568 | | | | | | | 4.7 | |
| Acryloid AU 608 | | | | | | | | 9.1 |
| Solvent blends: | | | | | | | | |
| Methyl cellosolve/cellosolve acetate/carbitol acetate | 40.0 | 40.0 | 40.0 | 40.0 | 40.0 | 40.0 | 40.0 | 40.0 |
| Dispersants: | | | | | | | | |
| Byk P104S | 0.43 | 0.43 | 0.43 | 0.43 | 0.43 | 0.43 | 0.43 | 0.43 |
| Multron R221-75 | 0.37 | 0.37 | 0.37 | 0.37 | 0.37 | 0.37 | 0.37 | 0.37 |
| Dibutyltin dilaurate 0.1% by weight of binder (optional) | | | | | | | | |
| NCO/OH ratio | 1.1 | 1.1 | 1.1 | 1.1 | 1.1 | 1.1 | 1.1 | 1.1 |
| Pigment/binder ratio | 2.3 | 2.3 | 2.3 | 2.3 | 2.3 | 2.3 | 2.3 | 2.3 |
| Pigment volume concentration, % | 36 | 36 | 36 | 36 | 36 | 36 | 36 | 36 |

In the examples shown in the table, the magnetic pigment employed was gamma iron oxide. The acrylic resins had hydroxyl numbers between 50 and 200, which can be derived from acrylates or methacrylates. The formulations used G-cure of Henkel and Acryloids of Rohm and Haas as typical examples. The blocked isocyanate was Mondur HCB, made by Mobay Chemical Company, which was ketoxime blocked isocyanate derived from 3 moles of TDI (tolylene diisocyanates) and 2 moles of HMDI (hexamethylene diisocyanate). Solvent blends can be any glycol ether acetates which provide good solvency and proper rheology for processing and application. The additives were dispersing agents such as Byk P104S of Byk-Mallinkrodt and Multron R221-75 by Mobay. Filler particles such as alumina may be used to enhance head/disk start/stop performance for rigid disks if desired.

It is recommended that the NCO/OH ratio be kept at 1.1, and the pigment/binder ratio be kept at 2.3, which is equivalent to a 36 percent pigment volume concentration. Dibutyltin dilaurate was used as the catalyst.

Various acrylic resins were used in the eight examples listed in Table I, which gave a wide range of properties to the coatings. The coating ingredients were mixed by pebble milling. Final adjustment of viscosity of the mixture can be accomplished if required before coating the substrate. The coating mixture was applied to a metallic substrate by spin coating.

Figure 2:
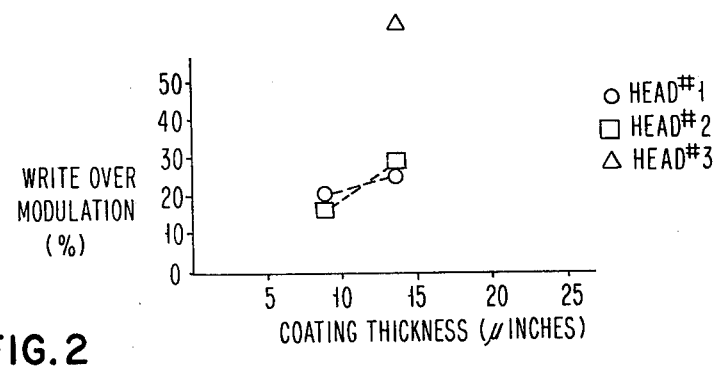
Figure 3:
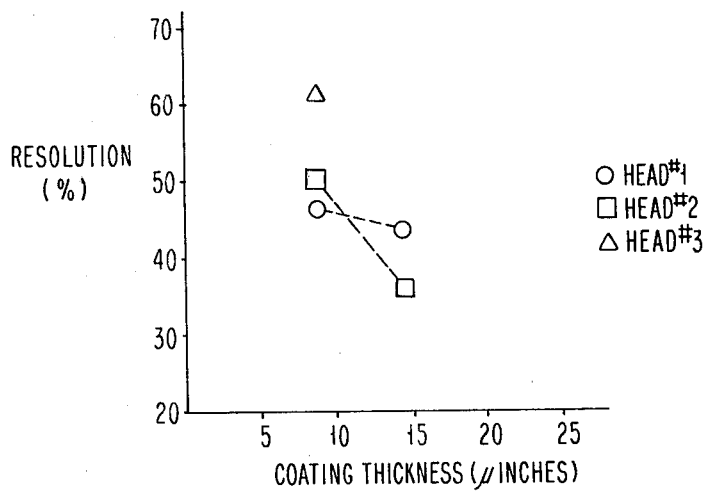

Magnetic disks coated in accordance with the formulation listed in Example 2 of Table I were tested for a number of magnetic parameters, and graphs illustrating the results of three of such tests are represented in FIGS. 1-3.

FIG. 1 represents a plot of normalized amplitude as a function of the magnetic disk coating thickness for three different magnetic heads used in the test. This test measures the signal amplitude per track width and the results are expressed in microvolts signal per micrometer of track width. Higher values of normalized amplitude are desirable in this test.

FIG. 2 is write-over modulation (WOM) data plotted as a function of coating thickness for three different magnetic heads used in the test. In this test, information is recorded on the magnetic disk at lower and higher frequencies after which the signal levels remaining on the disk are measured. Lower values of WOM represent goodness in this test.

FIG. 3 is a plot of resolution as a function of the disk coating thickness, again using three different magnetic heads. In this test, information is first written on the magnetic surface at a lower frequency and the energy level recorded is then measured. Following this, information is written at a higher frequency and the recorded energy level measured. Resolution is defined as the ratio of the high frequency energy level to that of the lower frequency, higher values of this measurement being desirable, indicating a lower loss of amplitude at the higher frequency.

I claim:

1. A magnetic recording coating composition comprising:
   a. 20-65 parts by weight of magnetic particles,
   b. a polymeric binder system for said particles containing 5-30 parts by weight of acrylic resins which contain reactive hydrogens,
      5-30 parts by weight of blocked isocyanates, and
      5-30 parts by weight of blocked polyisocyanates.

2. A magnetic recording coating composition in accordance with claim 1 in which said blocked isocyanate is a low molecular weight isocyanate with blocking agents of phenols, ketoximes or caprolactams.

3. A magnetic recording coating composition in accordance with claim 2 in which said resins include high or low molecular weight acrylic resins which have functional groups of hydroxyl groups, or amine groups or amide groups.

4. A magnetic recording coating composition in accordance with claim 1 including a blocked polyisocyanate which is blocked with oligomers or copolymers of tolylene diisocyanates, diphenylmethane diisocyanates or other isocyanates.

5. A magnetic recording composition in accordance with claim 1 including 20-70 parts by weight of solvent material.